(12) United States Patent
Tripathi et al.

(10) Patent No.: US 12,502,473 B2
(45) Date of Patent: Dec. 23, 2025

(54) AUTOMATED IDENTIFICATION OF ASPIRATED SALINE SOLUTION DURING VITREORETINAL SURGERY

(71) Applicants: Alcon Inc., Fribourg (CH); Duke University, Durham, NC (US)

(72) Inventors: Ashok Burton Tripathi, Santa Barbara, CA (US); Lejla Vajzovic, Durham, NC (US); Frank Brodie, San Francisco, CA (US)

(73) Assignee: Alcon Inc., Fribourg (CH)

( * ) Notice: Subject to any disclaimer, the term of this patent is extended or adjusted under 35 U.S.C. 154(b) by 909 days.

(21) Appl. No.: 17/661,376

(22) Filed: Apr. 29, 2022

(65) Prior Publication Data

US 2022/0347370 A1    Nov. 3, 2022

Related U.S. Application Data

(60) Provisional application No. 63/182,092, filed on Apr. 30, 2021.

(51) Int. Cl.
*A61M 1/00* (2006.01)
*A61F 9/007* (2006.01)

(52) U.S. Cl.
CPC .......... *A61M 1/73* (2021.05); *A61F 9/00736* (2013.01); *A61M 1/734* (2021.05); *A61M 1/74* (2021.05); *A61M 2205/3327* (2013.01); *A61M 2205/581* (2013.01); *A61M 2205/582* (2013.01); *A61M 2205/583* (2013.01)

(58) Field of Classification Search
CPC .......... A61M 1/73; A61M 1/734; A61M 1/74; A61M 2205/3327; A61M 2205/581; A61M 2205/582; A61M 2205/583; A61F 9/00736; A61F 9/00763
See application file for complete search history.

(56) References Cited

U.S. PATENT DOCUMENTS

| | | |
|---|---|---|
| 5,249,121 A | 9/1993 | Baum et al. |
| 6,290,690 B1 | 9/2001 | Huculak et al. |
| 8,109,937 B2 | 2/2012 | Huculak et al. |

(Continued)

FOREIGN PATENT DOCUMENTS

| | | |
|---|---|---|
| WO | 0226016 A2 | 4/2002 |
| WO | 03047653 A1 | 6/2003 |

*Primary Examiner* — James J Yang
(74) *Attorney, Agent, or Firm* — Quinn IP Law (57) ABSTRACT

A method for identifying saline solution in an aspirated fluid mixture during vitrectomy or another vitreoretinal surgery includes estimating a fluid property value of the mixture via an electronic control unit (ECU). The mixture includes saline solution and either vitreous or silicone oil. The method includes identifying the saline solution as a primary constituent fluid of the fluid mixture, via the ECU, based on the fluid property value, and activating an indicator device in response to the primary constituent fluid being the saline solution. An automated system for identifying saline solution in the aspirated fluid mixture includes the indicator device and the ECU. A computer-readable medium includes instructions, executable by a processor to identify an aspirated fluid mixture during a vitreoretinal surgery, with execution of the instructions by the processor causing the processor to perform the method.

20 Claims, 3 Drawing Sheets

(56) References Cited

U.S. PATENT DOCUMENTS

| | | | |
|---|---|---|---|
| 2006/0258938 A1* | 11/2006 | Hoffman | A61B 5/06 600/424 |
| 2008/0208207 A1* | 8/2008 | Huculak | A61M 1/77 606/107 |
| 2010/0156646 A1* | 6/2010 | Cull | A61M 1/73 340/606 |
| 2012/0273351 A1* | 11/2012 | Kraus | G05B 13/04 204/407 |
| 2014/0114297 A1* | 4/2014 | Woodley | A61B 3/102 606/4 |

* cited by examiner

AUTOMATED IDENTIFICATION OF ASPIRATED SALINE SOLUTION DURING VITREORETINAL SURGERY

CROSS-REFERENCE TO RELATED APPLICATIONS

This application claims priority to, and benefit of, U.S. Provisional Patent Application Ser. No. 63/182,092, filed on Apr. 30, 2021, which is hereby incorporated by reference in its entirety.

TECHNICAL FIELD

The present disclosure relates to automated methodologies and related hardware and software systems for identifying saline solution within an aspirated mixture of ocular fluids during a vitreoretinal surgery.

BACKGROUND

The vitreous humor gel, or vitreous for short, is a gelatinous collagen-containing aqueous body occupying the vitreous cavity, i.e., the intraocular space extending between the lens and the retina. Portions of the vitreous are carefully removed during vitreoretinal surgeries requiring vitrectomy, typically with the assistance of a vacuum-assisted vitrector. Removal of the vitreous is performed for a myriad of beneficial reasons, including eliminating translucent or transparent "floaters", treatment for posterior vitreous detachment (PVD), or to treat injury, disease, or age-related degeneration. Vitrectomy also enables a surgeon to access and properly visualize diseased or damaged ocular tissue such as a torn retina or macular holes.

As the vitreous is suctioned out of the vitreous cavity, miniature surgical blades housed within the vitrector quickly reduce the protein fibers into smaller pieces to facilitate extraction, as well as to minimize traction forces on the retina. Eye volume and intraocular pressure are maintained during vitrectomy via a coordinated infusion of sterile saline solution. Under certain conditions, a surgeon might infuse silicone oil into the vitreous cavity after vitrectomy, with such oil later removed from the eye to minimize post-surgical complications. The vitreous of a healthy eye is essentially transparent, as is the infused saline and silicone oil. Moreover, the aqueous vitreous mixes readily with the saline solution, unlike its interaction with hydrophobic silicone oil. As a result, it can be difficult for a surgeon to visually distinguish between the different types of fluids present within the vitreous cavity during the course of vitrectomy surgery or post-surgical follow up procedures.

SUMMARY

Disclosed herein are methods and accompanying systems for automatically identifying saline solution in an aspirated mixture of ocular fluids ("aspirated fluid mixture") during vitreoretinal surgery. At a given moment, the extracted volume of the aspirated fluid mixture could be composed of anywhere between 0% and 100% saline solution, with the remaining composition being more viscous fluids such as natural viscous or temporarily infused silicone oil. As noted above, the vitreous, saline solution, and silicone oil are essentially transparent, which can make it difficult for a surgeon to visually distinguish between the different fluids during surgery.

As appreciated in the art, as vitreous material is aspirated from the vitreous cavity, the surgeon simultaneously infuses the eye with saline solution. Volumetric flow of the saline solution and vacuum strength applied to a vitrector are typically governed in real-time by a computer-based vitrectomy system. Transparency of the disparate fluids that may present at an inlet of the vitrector, however, can lead to periods of aspiration of the saline solution, whether primarily or exclusively, instead of the intended fluid target, i.e., vitreous or silicone oil in different use cases. This in turn wastes saline solution and potentially extends surgery times. The present disclosure is therefore directed toward solving this particular problem using an intuitive feedback-based approach predicated on the different fluid properties of the constituent fluids of the aspirated fluid mixture.

With respect to the silicone oil (polydimethylsiloxane) in particular, such oil is temporarily infused in select instances, e.g., for treating complex retinal tears, inferior tears, or in patients unable to properly position themselves during extended post-surgical recovery. In addition, the silicone oil must later be removed and replaced with saline solution due to potential side effects such as glaucoma and corneal decompensation. Unfortunately, it can be difficult to achieve complete removal of the silicone oil. Silicone oil of the type used in the United States for intraocular infusion is available in viscosities of 1000 centistokes (cST) and 5000 cST. Water at 20° C. has a viscosity of 1 cST, with the viscosity of saline solution being only marginally higher. A dramatic difference therefore exists between the viscosities of silicone oil and saline solution. The present methodology can therefore be used to exploit this substantial fluid viscosity differential when differentiating between aspirated saline solution and aspirated silicone oil as another possible beneficial use case.

In general, the disclosed automated solutions determine one or more fluid property values, such as volumetric flow rate and vacuum strength. The fluid property value in turn is indicative of the presence of a primary constituent fluid within the makeup of the aspirated fluid mixture. While the fluid property value may be an estimated or actual viscosity in a possible approach, other values could be used in different embodiments. Alternatively, threshold flow rate comparisons could be performed for a given vitrector and vacuum strength to identify the primary constituent fluid, with higher flow rates coinciding with higher volumetric concentrations of saline solution.

According to an aspect of the disclosure, a method for identifying an aspirated fluid mixture during a vitreoretinal surgery includes estimating a fluid property value of the aspirated fluid mixture via an electronic control unit (ECU), which occurs in response to a set of input signals. The aspirated fluid mixture as contemplated herein is a variable mixture of saline solution and another ocular fluid, i.e., vitreous or silicone oil in different embodiments as noted above. The aspirated fluid mixture is carefully suctioned from a vitreous cavity of a patient eye under a controlled vacuum using a vitrector, as appreciated in the art, at various times during the course of the surgery, including possible post-surgical recovery or during follow-up procedures.

The method includes identifying a primary constituent fluid of the aspirated fluid mixture automatically via the ECU. This occurs based on the above-noted fluid property value(s). That is, the ECU identifies whether the aspirated fluid mixture, at any given moment, is predominantly or primarily composed of saline solution. Additionally, the present method includes activating an indicator device via the ECU in response to the primary constituent fluid being the saline solution, including transmitting an electronic activation signal indicative of the saline solution to the indicator device to thereby control an activation logic state of the indicator device.

The indicator device may include a display screen, in which case activating the indicator device includes presenting a message and/or a graphic via a display device. Alternatively or concurrently, the indicator device may include an audio speaker, such that activating the indicator device includes broadcasting an audible tone via the audio speaker. In still other embodiments, the indicator device may include a haptic or tactile feedback device, with activation of the indicator device causing the haptic or tactile feedback device to vibrate.

The method may include receiving, via the ECU from a graphical user interface, an input signal that is indicative of the particular model or type of the vitrector.

An automated system is also disclosed herein for identifying saline solution in an aspirated fluid mixture during a vitreoretinal surgery. The automated system in a possible embodiment includes an indicator device and an ECU in communication therewith. The ECU is configured to perform the above-summarized method.

Additionally, an aspect of the present disclosure includes a computer-readable medium on which is recorded instructions executable by a processor to identify saline solution within an aspirated fluid mixture during vitreoretinal surgery. Execution of the instructions by the processor causes the processor to estimate a fluid property value of the aspirated fluid mixture using the ECU, and to identify a primary constituent fluid of the aspirated fluid mixture based on the fluid property value. Additionally, execution of the instructions causes the processor to activate an indicator device via the ECU in response to the primary constituent fluid being the saline solution, including transmitting an electronic activation signal indicative of the primary constituent fluid to the indicator device to thereby control an activation logic state of the indicator device.

The above-described features and advantages and other possible features and advantages of the present disclosure will be apparent from the following detailed description of the best modes for carrying out the disclosure when taken in connection with the accompanying drawings.

The foregoing and other features of the present disclosure are more fully apparent from the following description and appended claims, taken in conjunction with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the present disclosure.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
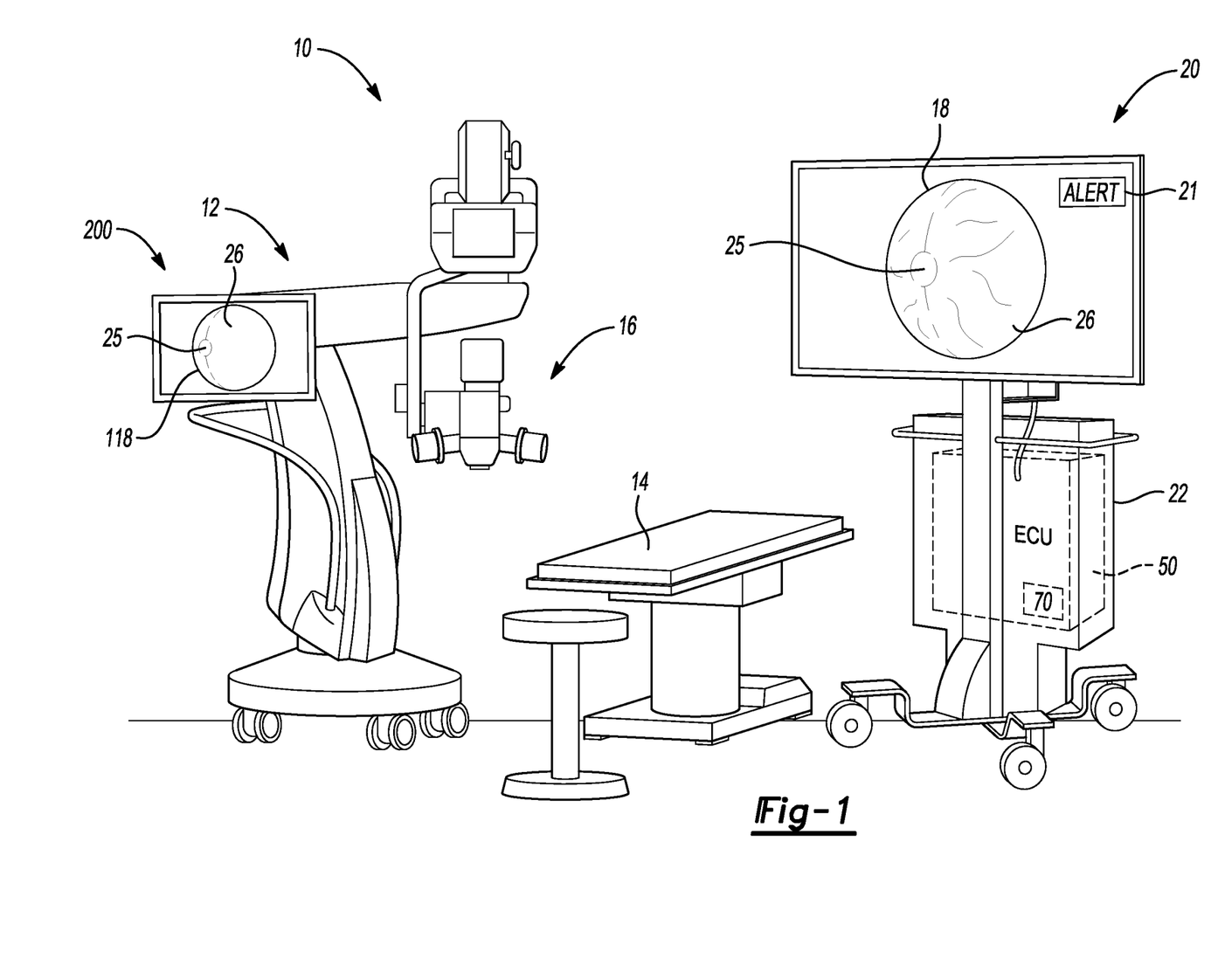
FIG. 1 illustrates a representative operating room setup having an automated system for identifying a vacuum-aspirated fluid mixture during vitreoretinal surgery in accordance with the present disclosure.

Referring to the drawings, wherein like reference numbers refer to like components, an ophthalmic surgical suite 10 is depicted schematically in FIG. 1. The range of possible ophthalmic procedures that could be performed within the ophthalmic surgical suite 10 may vary within the scope of the present disclosure, with the present teachings being applicable in particular to vitreoretinal surgeries, including but not limited to vitrectomies or other invasive procedures in which fluids are infused into and aspirated from a patient eye 30 (see FIG. 2). As described in detail below with reference to FIGS. 2 and 3, the present teachings may be used to identify the aspirated fluid mixture by virtue of its unique flow properties, with a specific beneficial end goal of identifying saline solution, shown at 48 in FIG. 3, as a predominant or primary constituent fluid component of the aspirated fluid mixture.

As appreciated by those skilled in the art, the ophthalmic surgical suite 10 of FIG. 1 may be equipped with a multi-axis surgical robot 12 and an operating table 14. The surgical robot 12 is typically connected to an ophthalmic grade microscope 16 through which a surgeon (not shown) is able to view a patient's ocular anatomy under high magnification. For example, using associated hardware and software, the surgeon is able to view highly magnified images 18 and 118, e.g., of a retina 25 and, in the foreground of the retina, a volume of transparent aqueous vitreous gel, hereinafter referred to as the vitreous 26 for simplicity. Visualization may be achieved via corresponding high-resolution medical display screens 20 and 200.

Figure 2:
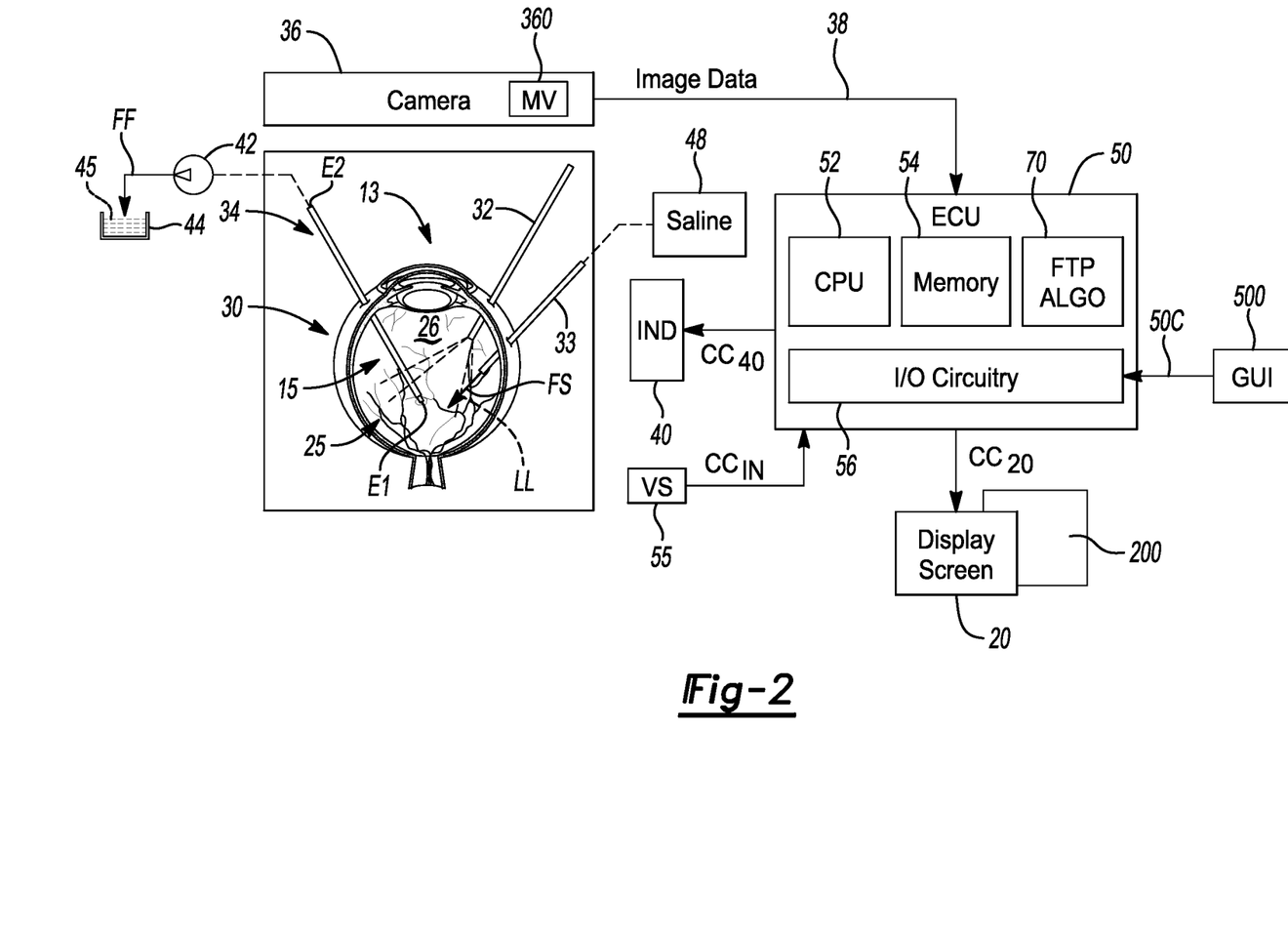
FIG. 2 is a schematic illustration of a possible embodiment of the automated system shown in FIG. 1.

Also present within the exemplary ophthalmic surgical suite 10 as depicted in FIG. 1 is an equipment cabinet 22 containing an electronic control unit (ECU) 50. The ECU 50 may be integrated with or separate from a vitrectomy system (VS) 55 as depicted in FIG. 2, with an embodiment of the ECU 50 likewise shown in FIG. 2 and described below. The cabinet 22, which as shown is collocated with the display screen 20, may be positioned elsewhere in the ophthalmic surgical suite 10 in other embodiments. Such an equipment cabinet 22 may be constructed of lightweight and easily sanitized medical grade materials, e.g., painted aluminum or stainless steel, and used to house the ECU 50 for the purpose of protecting its constituent hardware from possible ingress of dust, debris, and moisture.

Within the scope of the present disclosure, and as appreciated in the vitrectomy is a type of vitreoretinal surgery that involves the deliberate surgical removal of portions of the vitreous 26. As noted above, medical reasons possibly necessitating vitrectomy includes impeded vision due to translucent or transparent "floaters" due to posterior vitreous detachment (PVD), injury, disease, or age-related degeneration. Vitrectomy is also performed to improve visibility of or surgical access to the retina 25, such as when repairing macular holes, retinal tears, or other damage. Intraocular pressure changes resulting from removal of the vitreous 26 are accommodated in real-time by an infusion of sterile saline solution 48 from a supply 148 thereof (see FIG. 2).

Within this established context, the ECU 50 of the present disclosure is programmed with instructions or code embodying an algorithm 70, which in turn is executed when performing the present method for automatically identifying an aspirated fluid mixture during the above-noted vitrectomy or other vitreoretinal surgery, whether as a primary surgery or during post-surgical follow up treatment. When the aspirated fluid mixture is primarily the saline solution 48 instead of the intended vitreous 26, or instead of silicone oil in another possible use case, the ECU 50 automatically alerts the surgeon or other attending clinicians to this fact. Such alerts may be in the form of transmission of a suitable message and/or graphical alert 21 displayed on either or both of the display screens 20 or 200 of FIG. 1, by broadcasting an audible tone via an audio speaker, and/or by causing a haptic or tactile feedback device to vibrate in different approaches. Likewise, in use cases in which the surgeon is removing silicone oil and replacing it with saline solution 48, the ECU 50 may issue similar alerts or feedback to guide the surgeon away from the saline and toward the silicone oil.

Referring to FIG. 2, a representative patient eye 30 defining a vitreous cavity 15 is shown undergoing vitrectomy 13 involving the removal of at least some of the materials of the vitreous 26. As part of the vitrectomy 13, an endoilluminator 32 inserted into a vitreous cavity 15 emits light LL to fully illuminate the surgical task. Various lighting technologies may be used to emit the light LL, such as but not limited to red/green/blue (RGB) lasers, light-emitting diodes (LEDs), halogen bulbs, Xenon bulbs, etc., as appreciate in the art. Although represented in simplified form for illustrative clarity, the endoilluminator 32 is coupled to an accompanying filtered power supply, such as a filtered wall outlet or a battery pack and power inverter suitable for ensuring the reliable generation and transmission of the light LL into the vitreous cavity 15.

During the vitrectomy 13, the surgeon maneuvers an inlet end E1 of a vitrector 34 within the vitreous cavity 15 and carefully suctions off viscous materials constituting the vitreous 26. Within the scope of the disclosure, the vitrector 34 may be alternatively embodied as bladed vitreous cutter, a hypersonic vitrectomy probe that liquifies the vitreous 26 for ease of extraction rather than severing the vitreous via a high-speed cutting action as with the vitreous, or another suitable tool.

Concurrently with removal of the vitreous 26, an infusion canula 33 is used to control inlet pressure of saline solution 48 as the saline solution 48 is infused into the vitreous cavity 15. Depicted schematically for simplicity, the vitrectomy system 55 is operatively connected to the infusion canula 33, the supply 148 of the saline solution 48, the vitrector 34, and a vacuum pump 42 during the course of the vitrectomy 13, with the vitrectomy system 55 regulating volumetric flow rate of the saline solution 48 and vacuum strength of the vacuum pump 42.

In some embodiments, the volumetric flow rate and vacuum strength are reported to the ECU 50 as part of a set of input signals (arrow $CC_{IN}$), e.g., from the vitrectomy system 55, with the ECU 50 estimating a fluid property value of aspirated fluid mixture (FF) in response to the set of input signals (arrow $CC_{IN}$). As appreciated in the art, infusion of the saline solution 48 helps maintain intraocular pressure, which can otherwise fluctuate in response to removal of the vitreous 26. Fluid infusion is represented in FIG. 2 as arrow FS. An opposing outlet or discharge end E2 of the vitrector 34 is fluidly coupled to a suitable waste reservoir 44, such that the aspirated fluid mixture (FF) is deposited into the waste reservoir 44 for proper medical disposal.

As the surgeon maneuvers the inlet end E1 of the vitrector 34 within the vitreous cavity 15, the vacuum pump 42, e.g., a peristaltic pump, gently suctions the aspirated fluid mixture (FF) from the vitreous cavity 15. The aspirated fluid mixture (FF) at any given moment is composed of a variable mix of the saline solution 48, the vitreous 26 or silicone oil, as well as other possible fluids such as blood, injected dyes, etc. Ideally, as little of the saline solution 48 as possible is present within the volume of the aspirated fluid mixture (FF) in order to minimize material waste and shorten the duration of the saline solution 48 are usually transparent, which can make it difficult at times for the surgeon to accurately differentiate between the two fluid types when viewing images presented on the display screens 20 and 200 of FIG. 1, or when viewing the surgical site directly through accompanying optical pieces (not shown).

Figure 3:
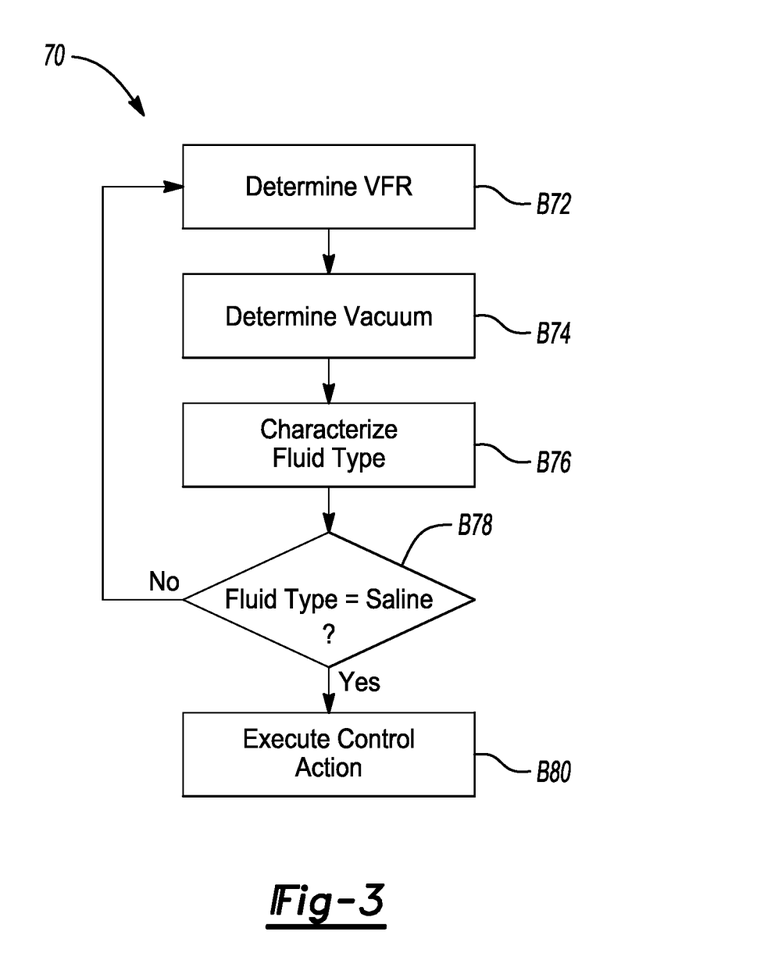
FIG. 3 is a flow chart describing an exemplary method for identifying saline solution within a vacuum-aspirated fluid mixture using the automated system shown in FIG. 1.

During the course of the vitrectomy 13, a digital or analog camera 36 or another high-resolution medical imaging device may collect image data 38 of the vitreous cavity 15, and thereafter transmit the collected image data 38 to the ECU 50 for possible processing in accordance with a fluid type prediction algorithm (FTP ALGO) 70. A method enabled by the algorithm 70 is depicted in FIG. 3 and described in detail below. While the camera 36 may be used for its customary functions, including imaging the retina 25 and other intraocular anatomy, aspects of the present disclosure include automatically detecting a model or type of the vitrector 34 using artificial intelligence/machine vision software (MV) 360 of the camera 36, e.g., alone or in conjunction with the ECU 50.

The ECU 50 could thereafter select calibrated vitrector parameters for the particular model or type of the vitrector 34, possibly automatically as detected and identified using the camera 36 and the machine vision software 360. Alternatively, the ECU 50 could receive an input signal (arrow 50C) from a graphical user interface (GUI) 500, e.g., a touch screen or keypad, with the input signal (arrow 50C) being indicative of the model or type of the vitrector 34 as identified by the surgeon or an attending clinician. For example, the surgeon could select the model or type from a displayed list using the GUI 500 rather than relying on automatic machine vision-based detection.

Still referring to FIG. 2, an indicator device (IND) 40 is in communication with the ECU 50 and configured to activate/turn on in response to an electronic indicator control signal (arrow $CC_{40}$) from the ECU 50. In response to the indicator control signal (arrow $CC_{40}$), and depending on the particular configuration of the indicator device 40, the indicator device 40 may provide a suitable audible, visible, and/or haptic tactile alarm or warning.

For instance, the indicator device 40 may be embodied as one of the display screens 20 and/or 200 of FIG. 1, in which case the indicator control signal (arrow $CC_{40}$) may cause the display screen(s) 20 and/or 200, e.g., via display control signals (arrow $CC_{20}$), to present a message and/or a graphic, such as the schematic alert 21 of FIG. 1. Alternatively, the indicator device 40 may be embodied as an audio speaker, such that activating the indicator device 40 via the indicator control signal (arrow $CC_{40}$) may cause the audio speaker to broadcast an audible tone. Other implementations of the indicator device 40 may include a color-coded lamp, such that receipt of the indicator control signal (arrow $CC_{40}$) causes the indicator device 40 to light up in a readily identifiable manner, e.g., using red light. In still other implementations, the indicator device 40 could be a haptic or tactile feedback device, e.g., a mat or a wearable device, or an external buzzer, such that activating the indicator device 40 could cause the feedback device to vibrate.

Although the ECU 50 is depicted schematically in FIG. 2 as a unitary box for illustrative clarity and simplicity, the ECU 50 and, for its part, the vitrectomy system 55, could include one or more networked devices each with a central processing unit (CPU) or other processor 52 and sufficient amounts of memory 54, including a non-transitory (e.g., tangible) medium that participates in providing data/instructions that may be read by the processor 52. Instructions embodying the algorithm 70 may be stored in memory 54 and executed by the processor 52 to perform the various functions described herein, thus enabling the present method. The memory 54 may take many forms, including but not limited to non-volatile media and volatile media.

As will be appreciated, non-volatile media may include optical and/or magnetic disks or other persistent memory, while volatile media may include dynamic random-access memory (DRAM), static RAM (SRAM), etc., any or all which may constitute a main memory of the ECU 50. Input/output (I/O) circuitry 56 may be used to facilitate connection to and communication with the various peripheral devices used during the vitrectomy 13, inclusive of the camera 36, the endoilluminator 32, the indicator device 40, and the display screen(s) 20 and/or 200. Other hardware not depicted but commonly used in the art may be included as part of the ECU 50, including but not limited to a local oscillator or high-speed clock, signal buffers, filters, etc.

Referring now to FIG. 3, an accompanying method is enabled by execution of computer-readable code or instructions embodying the present algorithm 70. That is, execution of instructions previously stored or recorded in memory 54 of the ECU 50 shown in FIG. 2 causes the processor 52 and other hardware of the ECU 50 to perform the present method. For clarity, therefore, the method is referred to hereinafter as the method 70, i.e., interchangeably with the underlying code of the algorithm 70.

In general, the ECU 50 is used to estimate a fluid property value of the aspirated fluid mixture (FF) in response to the set of input signals (arrow $CC_{IN}$). The aspirated fluid mixture (FF) is a mixture of the saline solution 48, as noted above, and the vitreous 26 suctioned from the vitreous cavity of the patient eye through the vitrector 34, or silicone oil in the particular post-surgical use case in which silicone oil is replaced with saline solution 48.

Embodiments of the method 70 include identifying a primary constituent fluid of the aspirated fluid mixture (FF), via the ECU 50, based on this fluid property value. While the fluid property value in question could be a predetermined viscosity value in some embodiments, other embodiments may use simple flow rate thresholding/threshold comparison function for a given vitrector 34 and vacuum strength to identify the primary constituent fluid. The latter exemplary use case is depicted in the non-limiting embodiment of FIG. 3.

The method 70 includes activating the indicator device 40 via the ECU 50 in response to the primary constituent fluid being the saline solution 48. This may include transmitting an electronic activation signal $CC_{40}$ to the indicator device 40, with such a signal being indicative of the primary constituent fluid, and having the effect of controlling an activation logic state of the indicator device 40. Activation of the indicator device 40 in any or all of its permutations may occur in response to the primary constituent fluid being the saline solution 48, with the electronic activation signal $CC_{40}$ controlling an ON/OFF activation logic state of the indicator device 40.

A non-limiting representative embodiment of the method 70 commences with block B72. To estimate viscosity or another suitable fluid property value of the aspirated fluid mixture (FF), the ECU 50 may first determine a volumetric flow rate ("VFR") of the saline solution 48 as the saline solution 48 is infused into the vitreous cavity 15 of the patient eye 30 shown in FIG. 2. For instance, the vitrectomy system 55 may communicate the volumetric flow rate to the ECU 50 as part of the set of input signals ($CC_{IN}$). Block B72 occurs during an aspiration stage of the vitrectomy 13, i.e., one when the aspirated fluid mixture (FF) containing a mixture of the vitreous 26 and the saline solution 48 is gently suctioned from the vitreous cavity 15. The method 70 then proceeds to block B72.

At block B72, the method 70 includes determining, via the ECU 50, a vacuum strength imparted to a vitrector 34 during the aspiration stage. As with block B72, this process step may entail receiving the vacuum strength as a reported value from the vitrectomy system 55 as part of the input signals ($CC_{IN}$). The method 70 thereafter proceeds to logic block B74.

Block B76 of FIG. 3 includes automatically identifying/characterizing the aspirated fluid mixture (FF) as a primary constituent fluid, via the ECU 50. "Primary" may be calibrated to a set or surgeon-adjustable level, typically at least 50% saline solution 48 by volume, but possibly lower in other embodiments. Such fluid type characterization may be performed using the aforementioned volumetric flow rate and vacuum strength, in addition to reference to calibrated operating parameters descriptive of the particular vitrector 34 in use. Relevant parameters include, by way of example and not of limitation, the diameter of the vitrector 34, the shape and size of an orifice at the inlet end E1, a duty cycle the vitrector 34, etc.

A possible implementation could include recording multiple lookup tables in memory 54 of the ECU 50. For a given vitrector 34, for example, the memory 54 may be populated with multiple lookup tables. Each one of the lookup tables in such an embodiment in turn could be indexed or referenced by vacuum strength and volumetric flow rate, with such a lookup table populated by a corresponding primary fluid or flow property value indicative thereof. As an illustrative example, for a user-identified or automatically-identified vitrector 34, the ECU 50 may access such a lookup table, the columns of which are indexed by volumetric flow rate and the rows of which are populated by vacuum strength, or vice versa. A cell located at the intersection of a given row and column could be prepopulated with a primary constituent fluid, e.g., the saline solution 48, the vitreous 26, silicone oil, etc.

Alternatively, the cell located at such an intersection could be populated with a flow property value, e.g., an estimated viscosity, with the ECU 50 then comparing the estimated viscosity to thresholds indicative of the various ocular fluids that could be present. Still other embodiments may forego use of lookup tables in favor of a simple volumetric flow rate threshold comparison for a given vacuum strength and vitrector 34. For instance, knowing that a specific make and model of the vitrector 34 is being used at a particular vacuum strength, the ECU 50 could compare the volumetric flow rate to a calibrated set of volumetric flow rates. If the volumetric flow rate is less than a calibrated flow rate threshold, the ECU 50 could record a bit value indicative of the vitreous 26, while a volumetric flow rate exceeding that which is expected from aspiration of the vitreous 26 could trigger recording of a bit value indicative of the saline solution 48.

As noted above, in some approaches the camera 36 and/or the ECU 50 may automatically detect the model or type of the vitrector 34, e.g., using the machine vision software 360 or artificial intelligence, e.g., using pattern recognition, neural networks, etc. The parameters are then selected for the particular model or type of the vitrector 34 using the ECU 50, or the surgeon or clinician could simply enter the parameters using the GUI 500 of FIG. 2 such as by selecting from a displayed list of options.

Characterizing or identifying the aspirated vitreous fluid FF could also or alternatively include estimating an amount of the saline solution 48 or other fluids, e.g., the vitreous 26 or silicone oil, that is present in the aspirated fluid mixture (FF), e.g., using a flow model that predicts the primary constituent fluid, e.g., based on the above-noted flow and vacuum strength values, with such a flow model possibly being table-based or formula-based in different embodiments. The method 70 then proceeds to block B78.

At block B78 of FIG. 3, the ECU 50 next determines whether the primary constituent fluid identified in block B76 is the saline solution 48, with the ECU 50 doing so based on the flow property value indicative thereof. The method 70 proceeds to block B80 when the saline solution 48 is identified as the primary constituent fluid. The method 70 returns to block 72 in the alternative if the primary constituent fluid from block B76 is the vitreous 26, or silicone oil when replacement of silicone oil is the relevant task in lieu of removal of the vitreous 26.

Block B80 includes executing a control action via the ECU 50 in response to the determination at block B78 that the saline solution 48 is the primary constituent fluid component of the aspirated fluid mixture (FF). Block B80 could entail transmitting the electronic activation signal ($CC_{40}$) to the indicator device 40 via the ECU 50 in response to the primary constituent fluid being the saline solution 48 in order to modify an ON/OFF or intermediate activation state thereof. The indicator device 40 may in some implementations of the method 70 be activated only when the primary constituent fluid is the saline solution 48. Such an approach would minimize potentially distracting notifications by alerting the surgeon only when significantly more saline solution 48 is being suctioned out of the vitreous cavity 15 than the intended materials of the vitreous 26 or silicone oil. By optionally providing the surgeon with some level of control over the threshold of "significantly more" during a given surgery, the surgeon is afforded an opportunity to tune the alerts to the surgeon's preferences.

In using the ECU 50 of FIGS. 1 and 2 in this manner to execute the algorithm 70 shown in FIG. 3, a surgeon performing the vitrectomy 13 shown in FIG. 2 is made aware, in real-time, of whether saline solution 48 is the primary constituent fluid of the aspirated fluid mixture (FF). This feedback allows the surgeon the opportunity to accurately adjust positioning of the inlet end E1 of the vitrector 34 within the vitreous cavity 15. Moreover, isolation of feedback to instances during which the saline solution 48 makes up most of, e.g., 50% or more of, the content of the aspirated fluid mixture (FF) should minimize distraction or alert-based interruptions.

In an exemplary use case, a surgeon could set the ECU 50 to trigger alerts at a default composition, e.g., 50% or more saline solution 48, and perform the vitrectomy 13 at such a level for a period of time. In this instance, alarms or feedback would be triggered when the method 70 determines that more than 50% of the makeup of the aspirated fluid mixture (FF) is the saline solution 48. Sometime during the procedure, the surgeon could then determine that removal of a higher concentration of the saline solution 48 is warranted, thus allowing the triggering threshold to be increased. Interaction with the GUI 500 could be used for this purpose, either as a separate device or integrated with one of the display screens 20 or 200 of FIG. 2. Likewise, when replacing previously infused silicone oil with the saline solution 48, the surgeon could use the real-time feedback from the ECU 50 to determine, at a glance, whether the aspirated fluid mixture (FF) is primarily composed of the saline solution 48.

The present teachings are therefore intended to inform a surgeon in real-time when the surgeon is no longer removing the vitreous 26. Receipt of the alert allows the surgeon to reposition the vitrector 34 for improved efficiency, enabling the surgeon to complete the vitrectomy 13 in less time, and with minimal waste. The disclosure can be used to modulate the vitrectomy system 55 to avoid drawing too much saline or other replacement fluid out of the patient eye 30. That is, when the ECU 50 identifies that the estimated viscosity is decreasing, the processor 52 could direct the vitrectomy system 55 to decrease the vacuum strength and reduce the volumetric flowrate of the saline solution 48.

Once the vitrector 34 is moved into the vitreous 26 or silicone oil, the volumetric flowrate decreases further due to the increased viscosity of the non-saline fluid(s). As a result, the vacuum level is increased to maximize removal of the more viscous materials, be it the vitreous 26, silicone oil, or other fluids. With high precision sensing, very small changes in volumetric flowrate could be detected to enable rapid adaptation to the latest conditions. With proper tuning, use of the method 70 should be seamless and non-obtrusive, from the surgeon's perspective, while markedly reducing the amount of wasted time removing the saline solution 48 during surgery. These and other attendant benefits will be readily appreciated by those skilled in the art in view of the forgoing disclosure.

The detailed description and the drawings are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims.

Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed:

1. A method for identifying saline solution in an aspirated fluid mixture during a vitreoretinal surgery performed by a surgeon using a vitrector, the method comprising:
recording multiple lookup tables in memory of an electronic control unit (ECU), the multiple lookup tables being populated with a primary constituent fluid of the aspirated fluid mixture and indexed by a volumetric flow rate and vacuum strength of the vitrector;
estimating a fluid property value of the aspirated fluid mixture in response to a set of input signals, via the ECU, wherein the aspirated fluid mixture includes a mixture of the saline solution and at least one additional fluid;
identifying the primary constituent fluid, via the ECU, based on (i) a surgeon-adjustable threshold percentage of the saline solution in the aspirated fluid mixture, and (ii) the fluid property value;
activating an indicator device via the ECU in response to the primary constituent fluid being the saline solution, including transmitting an electronic activation signal to the indicator device to thereby control an activation logic state of the indicator device; and
increasing the surgeon-adjustable threshold percentage during the vitreoretinal surgery, via the ECU, such that a higher concentration of the saline solution in the aspirated fluid mixture is permitted, thereby tuning the activation logic state to a preference of the surgeon.

2. The method of claim 1, wherein the at least one additional fluid includes vitreous and/or silicone oil.

3. The method of claim 1, wherein the ECU is in communication with a vitrectomy system operable for regulating a vacuum strength imparted to a vitrector, and a volumetric flow rate of the saline solution when the saline solution is infused into the vitreous cavity, and wherein determining the fluid property value includes receiving the set of input signals from the vitrectomy system indicative of the vacuum strength and the volumetric flow rate, and thereafter estimating the fluid property value using the vacuum strength and the volumetric flow rate.

4. The method of claim 1, wherein identifying the saline solution includes extracting a value indicative of the saline solution from one or more of the lookup tables indexed by the volumetric flow rate and the vacuum strength.

5. The method of claim 4, further comprising:
automatically detecting a model or type of a vitrector used to perform the vitreoretinal surgery using a camera and associated machine vision logic, wherein the lookup table is uniquely associated with the model or type of the vitrector.

6. The method of claim 1, wherein identifying the saline solution includes estimating an amount of the saline solution that is present in the aspirated fluid mixture using a flow model.

7. The method of claim 1, wherein the indicator device includes a display screen, and wherein activating the indicator device includes presenting a message and/or a graphic via a display device.

8. The method of claim 1, wherein the indicator device includes an audio speaker, and wherein activating the indicator device includes broadcasting an audible tone via the audio speaker.

9. The method of claim 1, wherein the indicator device includes a haptic or tactile feedback device, and wherein activating the indicator device includes causing the haptic or tactile feedback device to vibrate.

10. An automated system for identifying an aspirated fluid mixture during a vitreoretinal surgery performed by a surgeon using a vitrector, the automated system comprising:
an indicator device; and
an electronic control unit (ECU) in communication with the indicator device, wherein the ECU includes a memory containing multiple lookup tables each (i) populated with a primary constituent fluid of the aspirated fluid mixture, and (ii) indexed by a volumetric flow rate and a vacuum strength of the vitrector, and wherein the ECU is configured to:
estimate a fluid property value of the aspirated fluid mixture in response to a set of input signals, wherein the aspirated fluid mixture includes saline solution and either vitreous or silicone oil suctioned from a vitreous cavity of a patient eye using a vitrector during the vitreoretinal surgery;
identify the saline solution as a primary constituent fluid of the aspirated fluid mixture based on the fluid property value based on (i) a surgeon-adjustable threshold percentage of the saline solution in the aspirated fluid mixture, and (ii) the fluid property value;
activate an indicator device in response to the primary constituent fluid being the saline solution, including transmitting an electronic activation signal to the indicator device to thereby control an activation logic state of the indicator device; and
increase the surgeon-adjustable threshold percentage during the vitreoretinal surgery such that a higher concentration of the saline solution in the aspirated fluid mixture is permitted, thereby tuning the activation logic state to a preference of the surgeon.

11. The automated system of claim 10, further comprising:
a vitrectomy system in communication with the ECU, and configured to regulate the volumetric flow rate of the saline solution into the vitreous cavity and the vacuum strength, and to communicate the volumetric flow rate and the vacuum strength to the ECU in real-time during the vitreoretinal surgery, wherein the ECU is configured to estimate the fluid property value based on the vacuum strength and the volumetric flow rate.

12. The automated system of claim 10, wherein the ECU is configured to identify the saline solution as the primary constituent fluid by extracting a value indicative of the saline solution from one of the lookup tables recorded in the memory of the ECU.

13. The automated system of claim 10, further comprising:
a camera in communication with the ECU or integrally formed therewith; and
machine vision logic, wherein the ECU is configured to automatically detect a model or type of the vitrector using the camera and the machine vision logic, and to estimate the fluid property value of the aspirated fluid mixture using calibrated operating parameters corresponding to the model or type of the vitrector.

14. The automated system of claim 10, wherein the indicator device includes a display screen configured to present a message and/or graphic in response to the electronic activation signal.

15. The automated system of claim 10, wherein the indicator device includes an audio speaker configured to broadcast an audible tone via the audio speaker in response to the electronic activation signal and/or a haptic or tactile feedback device configured to vibrate in response to the electronic activation signal.

16. The automated system of claim 10, further comprising:
a graphical user interface (GUI) in communication with the ECU, wherein the GUI is configured to receive the model or type of the vitrector as a touch input, and to identify the saline solution as the primary constituent fluid in part based on a model or type of the vitrector.

17. The automated system of claim 10, further comprising:
the vitrector; and
a vacuum pump operatively connected to the vitrector.

18. A non-transitory computer-readable medium on which is recorded instructions, executable by a processor to identify an aspirated fluid mixture during a vitreoretinal surgery performed by a surgeon, wherein execution of the instructions by the processor causes the processor to:
during the vitreoretinal surgery, receive a vacuum strength applied to a vitrector, a model or type of the vitrector, and a volumetric flow rate of saline solution that is infused into a vitreous cavity of a patient eye;
compare the volumetric flow rate to a flow rate threshold corresponding to a model or type of the vitrector and the vacuum strength;
identify the primary constituent fluid of the aspirated fluid mixture based on (i) a surgeon-adjustable threshold percentage of the saline solution in the aspirated fluid mixture, and (ii) the volumetric flow rate exceeding the flow rate threshold;
control an activation logic state of an indicator device in response to the primary constituent fluid being at or above the surgeon-adjustable threshold percentage of the saline solution, including transmitting an electronic activation signal to the indicator device; and
selectively increase the surgeon-adjustable threshold percentage during the vitreoretinal surgery, such that a higher concentration of the saline solution in the aspirated fluid mixture is permitted, thereby tuning the activation logic state to a preference of the surgeon.

19. The non-transitory computer-readable medium of claim 18, wherein a camera is in communication with the ECU or integrally formed therewith, and wherein execution of the instructions by the processor causes the processor to:
automatically detect the model or type of the vitrector using the camera and machine vision logic.

20. The non-transitory computer-readable medium of claim 18, wherein execution of the instructions by the processor causes the processor to:
receive, from a vitrectomy machine in communication with the ECU, the volumetric flow rate and the vacuum strength imparted to the vitrector.

* * * * *